Patented Feb. 7, 1950

2,496,261

UNITED STATES PATENT OFFICE 2,496,261

PREPARATION OF BETA-AMYLASE FROM SWEET POTATOES

Arnold K. Balls and Mayo K. Walden, Berkeley, and Robert R. Thompson, Albany, Calif., assignors to the United States of America as represented by the Secretary of Agriculture No Drawing. Application October 18, 1946, Serial No. 703,972

6 Claims. (Cl. 195—62)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the preparation of beta-amylase from juice of sweet potatoes or other sources.

One object of this invention is the preparation of pure crystalline beta-amylase.

A further object is the provision of pure, colorless solutions or suspensions of beta-amylase.

Another object is a process of extracting beta-amylase from sweet potatoes without decreasing the utility of the sweet potato starch.

The process consists essentially of three parts: 1. Preparation of the first crude ammonium sulfate precipitate from the press juice of sweet potatoes that has been heated and clarified with lead. 2. Removal of impurities by stepwise acidification. 3. The fractionation of nearly pure material with ammonium sulfate until the enzyme crystallizes.

The sweet potatoes are finely ground without peeling. A disintegrator may be used. This produces a thick mush from which the juice is easily removed in a press. The starch and fiber are for the most part in the cake. The removal of amylase from the press cake is practically complete.

The juice is next heated to 60° C. to inactivate other enzymes, and cooled immediately. It is advantageous, but not necessary, to allow the juice to stand then about a week at a temperature of 5° C. The juice is next clarified by the addition of basic lead acetate. The lead reagent is added until the precipitate formed carries down considerable enzyme with it. This point is determined by making assays on small samples of the juice after additions of lead. When the proper quantity of basic lead acetate has been determined, a large quantity of the juice is treated therewith, then filtered to remove the precipitate, which is discarded. The protein still remaining in the filtrate is next precipitated by 0.7 saturation with respect to ammonium sulfate by adding solid ammonium sulfate thereto. This precipitate contains the enzyme. It is stored as a paste in the ice box where it keeps indefinitely, and serves as a starting material for the subsequent purification.

A suitable quantity of the ammonium sulfate precipitate is dialyzed against tap water until practically free of sulfate. A preservative is used, such as toluene. The dialyzed solution is acidified with hydrochloric acid successively to pH 4.6 and 4.0, each time with the removal of any precipitate that forms. Such precipitates are most conveniently removed by centrifuging. The liquid resulting from these steps is next brought to quarter saturation with ammonium sulfate at about pH 4.0 and another precipitate is removed. The amylase in the solution remaining after its removal is completely precipitated with ammonium sulfate (at about 0.6 saturation) and again dialyzed as before. This is done to concentrate it. After dialysis, acidification with dilute hydrochloric acid is made as before and the precipitate removed at pH 4.6, 4.0, and 3.5. Thereafter the solution is made ¼ saturated with ammonium sulfate at pH 4, and this precipitate is also discarded. The enzyme, which still remains in solution, is precipitated at ½ saturation at pH 4 and redissolved in water so that the solution will be approximately one-quarter saturated with respect to ammonium sulfate and will contain from 0.2 to 2 percent of protein. Any material that does not dissolve under these conditions is removed by centrifuging.

Saturated ammonium sulfate solution of ordinary pH is next gradually added to this solution of the enzyme, which is kept cold. The addition causes a precipitate, and is continued until the system is ½ saturated with ammonium sulfate or until crystals of amylase appear. If no crystals are obtained, the fractionation process between ½ saturation and ¼ saturation with ammonium sulfate is repeated. In the absence of seed crystals, it may be necessary to repeat this fractionation many times, but once the crystals are obtained, the first fractionation is usually sufficient. When crystals appear in the solution below one-half saturation, ammonium sulfate is added slowly to 0.5–0.6 saturation in order to precipitate the remainder of the crystallizable enzyme. The crystals are separated from any accompanying amorphous material by suspending them in ⅔ saturated ammonium sulfate and centrifuging very slowly. Under these conditions the crystals settle, but the amorphous material remains suspended. The crystals are soluble in water and may be recrystallized by the cautious addition of ammonium sulfate thereto in the cold. (We have successively crystallized this material five times.) On analysis the crystals were found to contain between 17.0 and 17.5 percent of their dry weight of protein nitrogen. Four recrystallizations did not materially change the amylolytic activity per milligram of protein nitrogen. The crystals are usually 12 sided, consisting of a tetragonal prism capped at each end with a pyramid.

A specific example of the process is as follows:

From 200 pounds of fresh sweet potatoes 32 liters of juice were obtained. The juice was heated to 60° C. and cooled at once. It was then stored in a refrigerator at 5° C. for 6 to 7 days. To each liter of juice was then added 18 grams of basic lead acetate suspended in 90 cc. of water.

The precipitate so formed was removed by filtration and the filtrate made 0.7 saturated with solid ammonium sulfate. The precipitate produced by the ammonium sulfate was filtered off and kept as a paste. 200 pounds of sweet potatoes yielded 1,600 grams of this paste.

250 grams of the crude paste were dialyzed against tap water in the presence of toluene for three days. The dialystate contained 271,000 (arbitrary) amylase units and measured 460 cc. It was then acidified to pH 4.6 and filtered, and then acidified to pH 4.2 and again filtered. The filtrate was made 0.6 saturated with ammonium sulfate at pH 4.0 and filtered. The precipitate was placed on a porous plate to remove excess liquid. The moist but firm cake weighed about 4.8 grams. It was dissolved in 30 cc. of water. The solution was dialyzed again for 3 days and then brought successively with hydrochloric acid to pH 4.7, 4.3, and 3.4 with the removal by centrifuging each time of the precipitate formed. The remaining solution contained 28,000 arbitrary units of amylase equal to about 175 mg. of enzyme protein in a total volume of 35 cc. It was made half saturated with ammonium sulfate, the precipitate centrifuged down and redissolved in about 1½ times its volume of water. The solution was seeded with a small quantity of amylase crystals, and ordinary saturated ammonium sulfate solution was added very slowly. By the time the solution was brought to half saturation, the amylase therein had deposited in the form of crystals.

The product has many advantages over known beta-amylase preparations. The crystalline amylase forms colorless solutions in aqueous media, whereas the known extracts do not. The crystalline enzyme being pure may be used in a process without introducing any extraneous material.

In the following table, the activity of our crystalline enzyme is compared with that of several natural products:

| | |
|---|---|
| Sweet potatoes | 100–200 |
| White potatoes | 5 |
| Barley malt (beta-amylase) | 40 |
| Patent wheat flour | 40–60 |
| Soybeans | 120 |
| Rice bran | 75 |
| Beta-amylase crystals | 220,000 |

Our product has a number of uses impossible or impractical in the hitherto known beta-amylase products. Among them are the following:

Preparations containing amylase are frequently added to dough, in baking, to change part of the starch to sugar. All the preparations now in use contain other enzymes, particularly proteolytic enzymes, which are harmful in the dough because they tend to soften and liquefy it. Our product contains no other enzymes, with significant attendant advantages.

It is frequently of advantage to remove traces of starch from jellies, fruit juices, beer, and other foods and beverages. The usual preparations of amylase, due to other enzymes that accompany them, often cause undesirable changes to take place, sometimes resulting in imparting a foreign taste.

Another field of use of our pure enzyme is its incorporation in medicinal preparations, where the presence of a starch-digesting enzyme is desired, but where the presence of other enzymes is not. In the case of a medicinal preparation containing protein, in which the action of proteolytic enzymes is not desired, the use of our beta-amylase preparations, which are free from proteolytic enzymes, is advantageous.

Another practical application of our pure beta-amylase lies in the preparation of so-called limit dextrins from starch. These dextrins are what remains of the starch after beta-amylase has acted upon it. They are, however, attacked by alpha-amylase. At present, preparations of beta-amylase contain alpha-amylase. Hitherto such limit-dextrins have never been prepared in a state of assured purity. By the action of our crystalline beta-amylase, which is free of alpha-amylase, pure limit-dextrins are now readily prepared.

The invention is not confined to use of ammonium sulfate as protein impurities precipitant and as beta-amylase precipitant. However, ammonium sulfate is the preferred salt. For example, sodium sulfate and magnesium sulfate do not precipitate the beta amylase protein as completely as ammonium sulfate.

As indicated above, where the beta-amylase crystals exist in suspension in a salt solution the salt may be removed by dialysis, leaving the pure enzyme dissolved in water.

The crystals are very large, when compared to ordinary protein crystals. The size ranges from particles just visible in the microscope up to crystals measuring 20 x 30 microns, and even larger.

Having thus described our invention, we claim:

1. In a process of preparing crystalline beta-amylase from the juice of sweet potatoes, the steps comprising clarifying the juice with lead acetate, precipitating the enzyme and protein by partial saturation of the clarified juice with ammonium sulfate, dialyzing the precipitate against water to remove the sulfate, acidifying the dialyzate and removing the precipitate formed, partially saturating the solution with ammonium sulfate to about quarter saturation at about pH 4 and removing the precipitate, the beta-amylase remaining in solution, adding more ammonium sulfate to precipitate the beta-amylase, redissolving the precipitate in water, and adding ammonium sulfate to precipitate the beta-amylase crystals.

2. In a process of preparing beta-amylase from juice of sweet potatoes, the steps comprising clarifying the juice with lead acetate, precipitating the beta-amylase with ammonium sulfate, separating the sulfate from the precipitate, acidifying the latter in a number of stages to successively lower pH's and removing the impurities precipitated in each stage, partially saturating the solution with ammonium sulfate to precipitate impurities, increasing the ammonium sulfate content of the solution to precipitate the beta-amylase.

3. In a process of preparing beta-amylase from juice of sweet potatoes, the steps comprising clarifying the juice with lead acetate, precipitating the beta-amylase with ammonium sulfate, separating the sulfate from the precipitate, acidifying with hydrochloric acid in a number of stages in the pH range between about 4.6 to 3.5, removing the impurities precipitated at each stage, and bringing the resulting solution to about quarter saturation with ammonium sulfate, removing the resulting precipitate, and then adding more ammonium sulfate to about half saturation therewith to precipitate the beta-amylase.

4. The steps recited in claim 3 and subsequently redissolving the precipitated beta-amylase in water, seeding with beta-amylase crystals, and adding ammonium sulfate to precipitate the beta-amylase in the form of crystals.

5. In a process of preparing beta-amylase that is free from alpha-amylase and from proteolytic enzymes, extracting the juice from sweet potatoes, clarifying the juice with lead acetate, precipitating a beta-amylase containing substance by partial saturation of the clarified juice with ammonium sulfate, diaylzing the precipitate against water to remove the sulfate, acidifying the dialyzate with hydrochloric acid and removing the precipitate, bringing the resulting liquid to about quarter saturation with ammonium sulfate at about pH 4.0 and removing the resulting precipitate, and then adding more ammonium sulfate to the liquid to precipitate the beta-amylase, repeating the dialysis against water, the acidification, and the quarter saturation with ammonium sulfate, and thereafter precipitating the beta-amylase by half saturation with ammonium sulfate at about pH 4, redissolving the precipitate in water to form a solution about quarter saturated with ammonium sulfate, discarding undissolved matter, then adding more ammonium sulfate to precipitate crystals of beta-amylase.

6. In a process of preparing beta-amylase from the juice of sweet potatoes, the steps comprising clarifying the juice with lead acetate, precipitating a beta-amylase containing substance by partial saturation of the clarified juice with ammonium sulfate, dialyzing the precipitate against water to remove the sulfate, acidifying the dialyzate with hydrochloric acid in a number of stages in the pH range 4.6 to 3.5 and removing the impurities precipitated at each stage, bringing the resulting liquid to about quarter saturation with ammonium sulfate at about pH 4.0, and removing the resulting precipitate, and adding more ammonium sulfate to the resulting liquid to precipitate the beta-amylase.

ARNOLD K. BALLS.
MAYO K. WALDEN.
ROBERT R. THOMPSON.

REFERENCES CITED

The following references are of record in the file of this patent:

UNITED STATES PATENTS

| Number | Name | Date |
|---|---|---|
| 2,361,493 | Richee | Oct. 31, 1944 |

OTHER REFERENCES

Sherman et al., J. Biological Chemistry, vol. 104, pp. 501–509; 1934.

Biochemical Jour., July 1938, pages 1200–1203 by Green et al.

Enzymes by Sumner and Somers, 1943 ed., pages 35 to 39.